(No Model.)
A. B. SHAW.
PNEUMATIC TIRE.
No. 599,802. Patented Mar. 1, 1898.
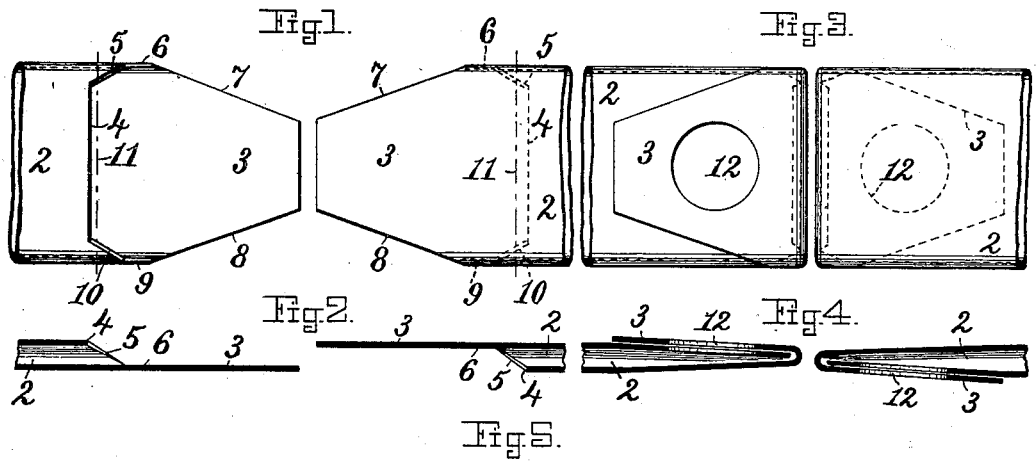
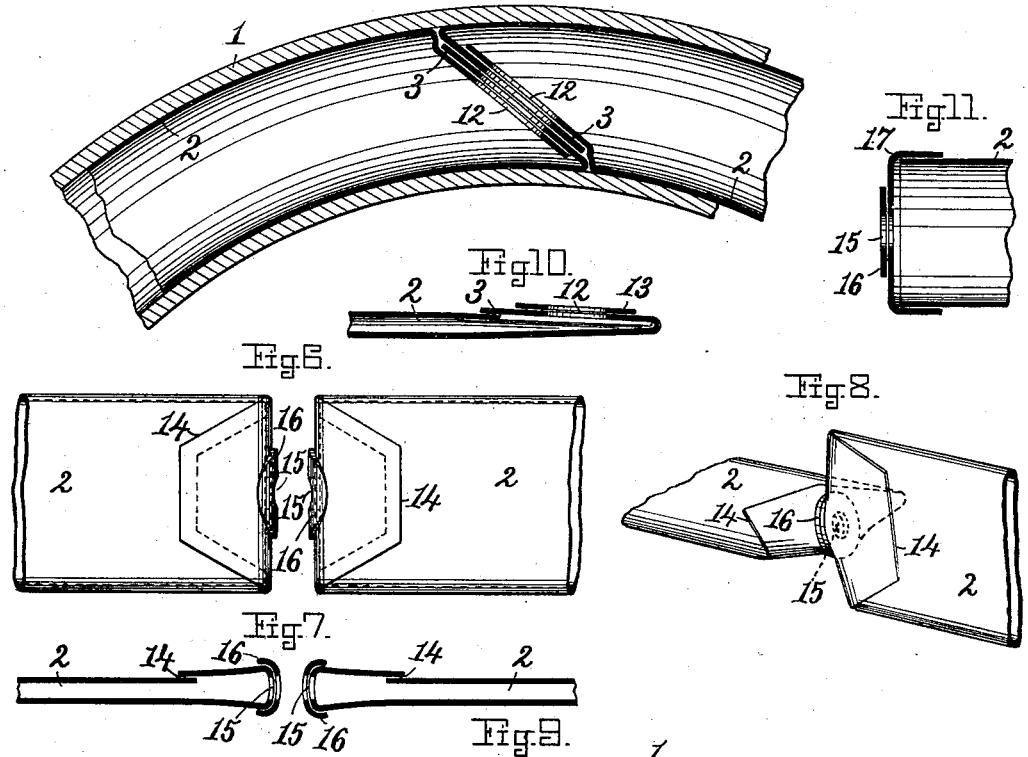
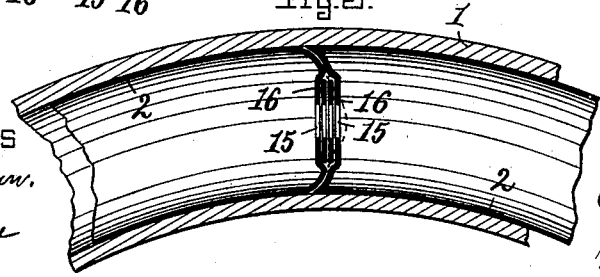
Witnesses
S. B. Thompson.
A. Mitchell
Inventor
Ai B. Shaw
by
Henry Chadbourne
his atty.
THE NORRIS PETERS CO., PHOTO-LITHO., WASHINGTON, D. C.

UNITED STATES PATENT OFFICE.

AI B. SHAW, OF MEDFORD, MASSACHUSETTS.

PNEUMATIC TIRE.

SPECIFICATION forming part of Letters Patent No. 599,802, dated March 1, 1898.

Application filed October 21, 1897. Serial No. 655,908. (No model.)

*To all whom it may concern:*

Be it known that I, AI B. SHAW, of Medford, in the county of Middlesex and State of Massachusetts, have invented certain new and useful Improvements in Pneumatic Tires, of which the following, taken in connection with the accompanying drawings, is a specification.

This invention relates to improvements in inner air-tubes for pneumatic tires, and in that class of air-tubes which are made separable from the outer casing in order to place them within or to remove them from said casing, and it relates more particularly to the manner of forming the ends of the tube and of connecting said ends together so as to establish a continuous air-passage around the entire tube when connected and to permit of quick and easy breaking of the joint between the ends of the tube, as well as the ease and certainty of making an air-tight joint between said ends, thus facilitating the insertion or removal of said tube.

The invention consists in forming the air-tube with partly-closed ends, so that when joined together the openings in the ends will coincide and form communication between the ends in the reinforcement of said ends, so as to allow the joint to be separated without liability of injury to the tube; in the formation of a tight joint between the ends by the application of cement around the openings therein; in the formation of the end of the tube, so as to reduce the amount of dead rubber at the joints between the ends, and thus cause an easy-riding tire when riding over said joint, and in minor details of construction, as will be understood by the complete description thereof.

The invention is carried out substantially as illustrated in the accompanying drawings, which form an essential part of this specification, and whereon—

Figure 1 represents a plan view of the ends of an inner air-tube, showing the preferred manner of cutting the end preparatory to closing the same. Fig. 2 represents a longitudinal section of the same. Fig. 3 represents a plan view of the finished ends of an inner air-tube as shown in Figs. 1 and 2, but showing the same partly closed. Fig. 4 represents a longitudinal section of the tube shown in Fig. 3. Fig. 5 represents a sectional view of a portion of a pneumatic tire with an inner air-tube made as shown in Figs. 3 and 4. Fig. 6 represents a plan view of the ends of an inner air-tube, showing a modified form of my invention. Fig. 7 represents a longitudinal section of an inner air-tube as shown in Fig. 6. Fig. 8 represents a perspective view of the ends of an inner air-tube made as shown in Fig. 6 and showing the preferred relative position of the ends when joined together. Fig. 9 represents a sectional view of a pneumatic tire provided with my improved inner air-tube constructed as shown in Fig. 6. Fig. 10 represents a longitudinal section of the ends of an inner air-tube, showing a slightly-modified form of my invention. Fig. 11 represents a section of another modified form of the end of an inner tube made in accordance with my invention.

Similar characters of reference refer to similar parts wherever they occur on the different parts of the drawings.

The tire is composed of the outer casing 1 and an inner air-tube 2, which air-tube is separable from the outer casing; and, as before stated, my invention relates to the inner air-tube, to the formation of the ends thereof, and to the manner of connecting said ends together so as to be easily and quickly connected or disconnected without liability of injury to said ends and so as to form a continuous air-passage around the entire tube.

I wish it to be understood that the particular kind of construction of the outer casing forms no part of my present invention and that my improved inner air-tube may be used in any outer casing in which the air-tube is made separate from the casing and is inserted or removed, as desired; also, that the ends of the tube may be partly closed in various ways, as will be fully understood by the complete description herein contained, without departing from the principal feature of my invention.

The ends of the inner air-tube may be made in various ways, so as to partly close the same; but in Figs. 1 to 5, both inclusive, I have illustrated one of the various ways for accomplishing this result, which seems to me to be the preferred way. In said figures the tube is flat both before and after it has been vulcanized. The tube is formed somewhat longer than is required to extend around the tire, and its opposite ends are then cut, so as to form a flap 3 at each end of the tube, the flap upon one end being on the under side of the tube, while the flap at the opposite end is upon the upper side of the tube. These flaps are formed by cutting the tube upon the lines 4, 5, 6, 7, 8, 9, and 10 (shown in Figs. 1 and 2) or in a substantially similar manner. The flap on the under side of one end of the tube is then folded backward on the broken line 11 against the upper side of the same end of the tube and is attached thereto, while the flap upon the upper side of the opposite end is then folded backward on the broken line 11 against the under side of the same end of the tube and is attached thereto, forming ends to the tube, substantially as shown in Figs. 3 and 4, each end being reinforced on one side by the flap thereon, substantially as shown and for a purpose to be described hereinafter. By forming the ends of the tube in this manner it will be seen that the tube may be formed complete, with its ends closed, prior to vulcanizing any part thereof and the completed inner tube be vulcanized at one and the same operation in the vulcanizer. Prior to vulcanizing the inner tube or after it has been vulcanized, as desired, the reinforced portions of the ends thereof are provided with the perforations 12, which perforations are so located that they leave a part of the reinforcement on all sides of the perforations.

The manner of using an inner air-tube constructed as thus far described is as follows: The tube is drawn into the outer casing in the usual manner. Cement is then applied to the reinforced portion of the ends of the tube around the perforation therein, and as the tube is made longer than required to extend around the entire tire it will be seen that the ends of the tube will overlap each other and that their cemented reinforced portions can be brought together and held firmly attached to each other by the action of the cement and in such a position that the perforations 12 on said ends will coincide and form open communication between the ends of the tube. The two connected ends of the tube are then placed within the casing, the casing sewed in the usual manner and secured to the rim of the wheel. If it is desired to remove the inner tube for repairs or for any other purpose, it is only necessary to withdraw the connected ends of the tube from the outer casing in the usual manner, when the cemented joint between said ends may easily be broken by pulling said ends apart, which on account of the reinforcements at said ends may be done without liability of tearing the tube. The entire tube may then be withdrawn from the casing in the usual manner, be repaired, and replaced as above described. This withdrawal and replacing of the tube may be accomplished very quickly, and on account of the joint being made between two flat cemented surfaces which rest against each other and simply by pressing the two ends between the thumb and finger without any special manipulation of the tube to bring said surfaces together it does not require skill to insure the making of a perfectly airtight joint. As the ends of the tube are reinforced on one side only and as these reinforcements are cemented together and located within the center of the air-tube, so that they do not come into contact with the inner surface of the outer casing, it will be seen that there is only a single thickness of the rubber which forms the inner tube resting against the outer casing. Therefore there is practically no dead rubber at the joint between the ends of the tube to lessen the resiliency of the tire at this place. It will also be seen that there is open communication formed between the connected ends of the tube by means of the perforation 12, and consequently that there is no liability of penning the air at the ends of tube, which has been found to be a defect in the inner tube with closed ends now in use.

If so desired, the ends of the tube may be constructed so as to be of a single thickness of rubber throughout, as shown in Fig. 10, and the perforation 12 in said end be reinforced by a separate piece or washer 13 vulcanized thereon, as shown in said figure.

In Figs. 6, 7, 8, and 9 I have shown a modified form of my invention in which the ends are formed square and partially closed, said ends being made by cutting one side of the tube shorter than the other side, then cutting a perforation 15 in the longer side, reinforcing this perforation by means of the reinforcement 16, if so desired, and turning the longer side back upon the shorter side, forming a joint or seam 14 and the perforation 15, as shown in said figures. The tube is thus formed complete prior to vulcanizing the same, but, if so desired, the tube may first be vulcanized with wholly open ends, and said ends may afterward be partially closed and finished by cementing. Each end of the tube 1 is formed in this manner and is thus provided with a perforation 15 for the purpose of creating a continuous air-chamber within the inner tube when the ends are joined together as set forth.

When the inner air-tube has been inserted within the outer casing, the ends of the said tube are joined together, so that the perforations in the ends of the tube coincide and form a continuous annular air-chamber within the tube.

I prefer to reinforce the tube around the perforation 15 by means of the reinforcement 16, made by increasing the thickness of the rubber around said perforation or by vulcanizing washers of suitable fabric within or upon the tube at this place, substantially as shown.

If so desired, the reinforcements 16 on the ends of the tube form comparatively flat surfaces around the perforation, so as to receive cement and thereby join the ends of the tube together air-tight. It is a very simple process to form a joint in this manner, as the two abutting surfaces of the reinforcements 16 are pressed together after the cement has been applied thereto, and any person can easily make a perfect joint in this way even though inexperienced in such work, as there is no liability of wrinkles or imperfections.

It has been found by experience that when the inner air-tubes of the tires are to be drawn into an outer tube or casing they are inserted with greater ease if said inner tubes are flat, and for this reason said inner tubes are generally vulcanized flat, so that they will naturally assume that shape, and will consequently expel the air as much as possible when their valved inlets are opened. It has also been found that when a flat elastic tube with square ends is inflated the expanding of the tube will cause the center of the ends of the tube to be drawn backward and the outer edges of the ends of the tube to project, making the ends of the tube concaved. On this account when I use a flat tube with square ends, as shown in Figs. 6, 7, 8, and 9, I prefer to join the ends of the tube together in such a manner that the flat ends will be in planes at right angles to each other, as shown in Fig. 8, so that the drawing backward and the projecting of the different parts of one end of the tube will compensate for the similar action of the other end of the tube, thus causing as uniform a strain as is possible on all parts of the ends of the tube when inflated and confined within an outer casing. The result of inflating an inner flat square-ended tube within an outer casing when the ends have been connected in the relative positions shown in Fig. 8 has been illustrated in Fig. 9, and it will be understood that by this manner of connecting the ends of the tube the liability of overstraining the center portions of the ends or the fulling of the material at the outer edges of the ends when inflated within an outer tube or casing is obviated.

By the peculiar manner of forming the partially-closed ends of the tube it will be seen that substantially all parts of the said ends may be made of even thickness with the other parts of the tube, and therefore the resiliency of the tire will be practically uniform. The manner of using this form of my improved inner tube is the same as described in relation to the form shown in Figs. 1 to 6, both inclusive.

In Fig. 11 I have shown still another form of my improved inner tube in which the tube is made cylindrical and is closed at either end by means of a circular cap 17, having the perforation 15 therein and the reinforcement 16 thereon, which cap is vulcanized on said tube.

My inner air-tube is provided with any of the common and well-known forms of air-valves for the purpose of inflating or deflating the same, but said valve has not been illustrated on the drawings, as it forms no essential part thereof.

Having thus described the nature, construction, and operation of my invention, I wish to secure by Letters Patent and claim—

1. In a pneumatic tire, an outer casing and an inner air-tube, made separate from the casing having its ends partly closed and connected together by cement applied around the perforations in the partly-closed ends, whereby a continuous air-chamber is formed around the entire tube and the joints between the ends are easily and quickly made and broken, for the purpose set forth.

2. In a pneumatic tire, an outer casing, and an inner air-tube made separate from the casing having its ends partly closed and provided with reinforcements around the openings in the ends and connected together by cement applied to said reinforcements, whereby a continuous air-chamber is formed around the entire tube, for the purpose set forth.

3. A separable air-tube for a pneumatic tire, having its ends partly closed and reinforcements around the perforations in the ends, the ends adapted to be separably joined together to form a continuous air-chamber by cement applied to the reinforcements, for the purpose set forth.

4. A separable air-tube for a pneumatic tire, having a perforation on the side of one end, and a perforation on the opposite side of the other end, whereby the ends may be overlapped and connected together to form a continuous air-chamber in the tube, for the purpose set forth.

5. A separable air-tube for a pneumatic tire, having a perforation on the side of one end, a perforation on the opposite side of the other end, and reinforcements around said perforations, whereby the ends may be overlapped and cement applied to the reinforcements to form a continuous air-chamber, for the purpose set forth.

6. A separable air-tube for a pneumatic tire, with its ends formed with a flap turned back upon the tube and vulcanized thereon to form reinforcements, thereto and perforated through said reinforcements, the ends of the tube reinforced and perforated on opposite sides, for the purpose set forth.

7. In a pneumatic tire, an outer casing, combined with an inner air-tube having its ends overlapping each other and separably cemented together and each of the opposite ends formed with a flap turned back upon the tube, vulcanized thereon to form reinforcements thereto and perforated through said reinforcements to form a continuous airchamber therein, the opposite ends of the tube being reinforced and perforated on opposite sides, for the purpose set forth.

In testimony whereof I have signed my name to this specification, in the presence of two subscribing witnesses, on this 18th day of October, A. D. 1897.

AI B. SHAW.

Witnesses:
   HENRY CHADBOURN,
   D. E. KEMPSTER.